(12) United States Patent
Wu et al.

(10) Patent No.: US 10,412,390 B2
(45) Date of Patent: Sep. 10, 2019

(54) VIDEO PROCESSING SYSTEM USING LOW-COST VIDEO ENCODING/DECODING ARCHITECTURE

(71) Applicant: MEDIATEK INC., Hsin-Chu (TW)

(72) Inventors: Ming-Long Wu, Taipei (TW); Tung-Hsing Wu, Chiayi (TW); Li-Heng Chen, Tainan (TW); Ting-An Lin, Hsinchu (TW); Yi-Hsin Huang, Taoyuan (TW); Chung-Hua Tsai, Kaohsiung (TW); Chia-Yun Cheng, Hsinchu County (TW); Han-Liang Chou, Hsinchu County (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 63 days.

(21) Appl. No.: 15/641,224

(22) Filed: Jul. 4, 2017

(65) Prior Publication Data

US 2018/0020221 A1    Jan. 18, 2018

Related U.S. Application Data

(60) Provisional application No. 62/361,113, filed on Jul. 12, 2016.

(51) Int. Cl.
| | | |
|---|---|---|
| *H04N 19/13* | (2014.01) | |
| *H04N 19/70* | (2014.01) | |
| *H04N 19/44* | (2014.01) | |
| *H04N 21/23* | (2011.01) | |
| *H04N 21/84* | (2011.01) | |

(Continued)

(52) U.S. Cl.
CPC .......... *H04N 19/13* (2014.11); *H04N 19/124* (2014.11); *H04N 19/172* (2014.11); *H04N 19/174* (2014.11); *H04N 19/18* (2014.11); *H04N 19/44* (2014.11); *H04N 19/70* (2014.11); *H04N 21/2365* (2013.01); *H04N 21/234363* (2013.01);

(Continued)

(58) Field of Classification Search
None
See application file for complete search history.

(56) References Cited

U.S. PATENT DOCUMENTS

| | | | | |
|---|---|---|---|---|
| 5,623,308 A | * | 4/1997 | Civanlar | .................. H04N 7/56 375/240.01 |
| 5,691,768 A | * | 11/1997 | Civanlar | .................. G06T 3/40 375/240.01 |

(Continued)

FOREIGN PATENT DOCUMENTS

| | | | |
|---|---|---|---|
| TW | 201408073 | A | 2/2014 |
| TW | 201424399 | A | 6/2014 |
| TW | 201501516 | A | 1/2015 |

*Primary Examiner* — Reza Aghevli
(74) *Attorney, Agent, or Firm* — Winston Hsu

(57) ABSTRACT

A video encoder has a processing circuit and a universal binary entropy (UBE) syntax encoder. The processing circuit processes pixel data of a video frame to generate encoding-related data, wherein the encoding-related data comprise at least quantized transform coefficients. The UBE syntax encoder processes a plurality of syntax elements to generate UBE syntax data. The encoding-related data are represented by the syntax elements. The processing circuit operates according to a video coding standard. The video coding standard supports arithmetic encoding. The UBE syntax data contain no arithmetic-encoded syntax data.

11 Claims, 18 Drawing Sheets

(51) Int. Cl.
*H04N 19/124* (2014.01)
*H04N 19/172* (2014.01)
*H04N 19/18* (2014.01)
*H04N 19/174* (2014.01)
*H04N 21/2365* (2011.01)
*H04N 21/2665* (2011.01)
*H04N 21/2343* (2011.01)
*H04N 21/845* (2011.01)

(52) U.S. Cl.
CPC ..... *H04N 21/2665* (2013.01); *H04N 21/8456* (2013.01)

(56) References Cited

U.S. PATENT DOCUMENTS

| | | | |
|---|---|---|---|
| 9,819,849 B1* | 11/2017 | Rivard | H04N 5/2256 |
| 9,854,279 B2* | 12/2017 | Petrov | H04N 21/23608 |
| 2012/0219229 A1* | 8/2012 | Springer | G06T 5/003 382/199 |
| 2015/0036736 A1* | 2/2015 | Lundberg | H04N 19/503 375/240.02 |
| 2015/0066929 A1* | 3/2015 | Satzke | H04L 67/10 707/737 |
| 2015/0139603 A1* | 5/2015 | Silverstein | H04N 5/23216 386/225 |
| 2015/0288996 A1* | 10/2015 | van der Schaar | H04N 21/6587 725/116 |
| 2016/0241854 A1 | 8/2016 | Cheng | |
| 2017/0099441 A1* | 4/2017 | Choi | H04N 5/247 |
| 2017/0311006 A1* | 10/2017 | Yang | H04N 21/234 |
| 2018/0035053 A1* | 2/2018 | Mak | G03B 9/02 |

* cited by examiner

IMG

| Slice 0,0 | · · · | Slice 0,m | Row 0 |
|---|---|---|---|
| Slice 1,0 | · · · | Slice 1,m | Row 1 |
| Slice 2,0 | · · · | Slice 2,m | Row 2 |
| ⋮ | ⋮ | ⋮ | |
| Slice n,0 | · · · | Slice n,m | Row n |

FIG. 6

VIDEO PROCESSING SYSTEM USING LOW-COST VIDEO ENCODING/DECODING ARCHITECTURE

CROSS REFERENCE TO RELATED APPLICATIONS

This application claims the benefit of U.S. provisional application No. 62/361,113, filed on Jul. 12, 2016 and incorporated herein by reference.

BACKGROUND

The disclosed embodiments of the present invention relate to video data processing, and more particularly, to a video processing system using low-cost video encoding/decoding architecture.

One conventional video system design may include a video transmitting system (or a video recording system) and a video receiving system (or a video playback system). Regarding the video transmitting system/video recording system, it may include a video encoder, an audio/video multiplexing circuit, and a transmitting circuit. Regarding the video receiving system/video playback system, it may include a receiving circuit, an audio/video demultiplexing circuit, a video decoder and a display engine. However, the conventional video system design may fail to meet the requirements of some ultra-low latency applications due to long recording latency at the video transmitting system/video recording system and long playback latency at the video receiving system/video playback system. In general, entropy decoding is a performance bottleneck of video decoding, and the performance of entropy decoding is sensitive to bitrate. High bitrate achieves better quality, but results in large latency. In addition, when there are multiple video sources, using one set of a video encoder and a video decoder to serve one of the video sources is not cost-effective.

SUMMARY

In accordance with exemplary embodiments of the present invention, a video processing system using low-cost video encoding/decoding architecture is proposed to solve the above-mentioned problem.

According to a first aspect of the present invention, an exemplary video encoder is disclosed. The exemplary video encoder includes a processing circuit and a universal binary entropy (UBE) syntax encoder. The processing circuit is arranged to process pixel data of a video frame to generate encoding-related data, wherein the encoding-related data comprise at least quantized transform coefficients. The UBE syntax encoder is arranged to process a plurality of syntax elements to generate UBE syntax data. The encoding-related data are represented by the syntax elements. The processing circuit operates according to a video coding standard. The video coding standard supports arithmetic encoding. The UBE syntax data contain no arithmetic-encoded syntax data.

According to a second aspect of the present invention, an exemplary video decoder is disclosed. The exemplary video decoder includes a universal binary entropy (UBE) syntax decoder and a processing circuit. The UBE syntax decoder is arranged to process UBE syntax data to generate a plurality of decoded syntax elements, wherein encoding-related data are represented by the decoded syntax elements, and the encoding-related data comprise at least quantized transform coefficients. The processing circuit is arranged to process the encoding-related data to reconstruct pixel data of a video frame. The processing circuit operates according to a video coding standard. The video coding standard supports arithmetic decoding. The UBE syntax data contain no arithmetic-encoded syntax data.

According to a third aspect of the present invention, an exemplary video processing system is disclosed. The exemplary video processing system includes a merging circuit and a video encoder. The merging circuit is arranged to receive a plurality of input video frames, and merge a plurality of video frames to create a merged video frame, wherein the video frames are derived from the input video frames, respectively. The video encoder is arranged to encode the merged video frame to output a bitstream.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a diagram illustrating a second partitioning design of a video frame according to an embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
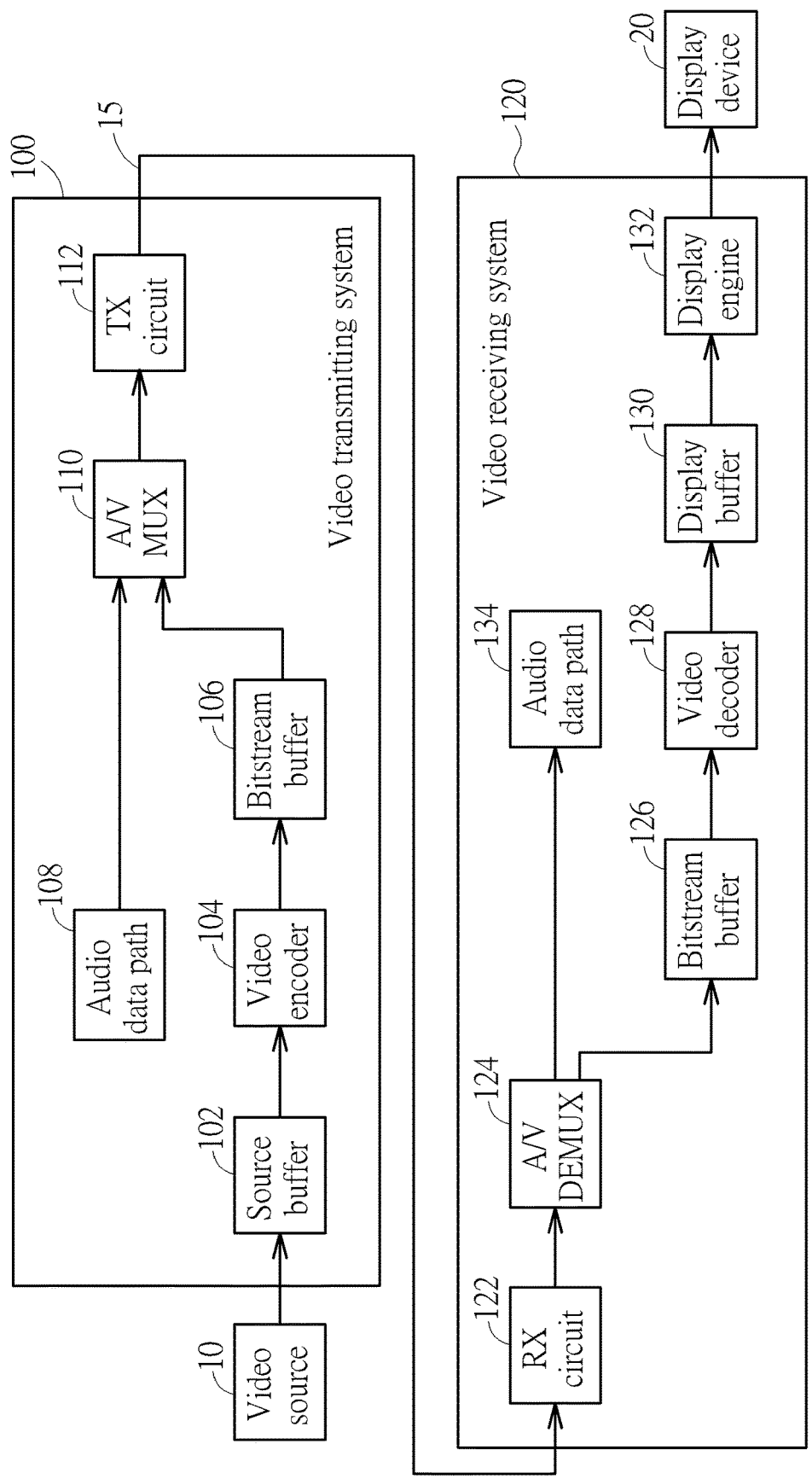
FIG. 1 is a block diagram illustrating a video transmitting system and a video receiving system according to an embodiment of the present invention.

FIG. 1 is a block diagram illustrating a video transmitting system and a video receiving system according to an embodiment of the present invention. Byway of example, but not imitation, the video transmitting system 100 and the video receiving system 120 may be employed by an ultra-low latency application such as a virtual reality (VR) application. In this embodiment, the video transmitting system 100 includes a source buffer 102, a video encoder 104, a bitstream buffer 106, an audio data path 108, an audio/video multiplexing circuit (denoted by "A/V MUX") 110, and a transmitting (TX) circuit 112; and the video receiving system 120 includes a receiving (RX) circuit 112, an audio/video demultiplexing circuit (denoted by "A/V DEMUX") 124, a bitstream buffer 126, a video decoder 128, a display buffer 130, a display engine 132, and an audio data path 134. The video transmitting system 100 may serve as a video recording system that is used to encode video frames provided from a video source 10 and generate encoded video frame data to the video receiving system 120 via a communication link 15, and the video receiving system 120 may serve as a video playback system that is used to receive encode video frame data from the communication link 15 and generate decoded video frames to a display device 20 for video playback. For example, the video source 10 may be a camera or a server, and the display device 20 may be a display screen of a VR headset. In addition, the communication link 15 may be implemented using a wired link or a wireless link.

A video frame to be encoded is provided by the video source 10. The source buffer 102 receives pixel data of pixels of the video frame to be encoded. The video encoder 104 encodes pixel data of the pixels of the video frame from the source buffer 102, and generates an encoded video bitstream. The bitstream buffer 106 receives the encoded video bitstream from the video encoder 104. The A/V MUX 110 receives the encoded video bitstream from the bitstream buffer 106 and an encoded audio bitstream from the audio data path 108, and performs audio/video multiplexing upon the encoded video bitstream and the encoded audio bitstream to generate a single bitstream to the TX circuit 112. The TX circuit 112 outputs the single bitstream (which is composed of the encoded video bitstream and the encoded audio bitstream) to the RX circuit 122 of the video receiving system 120 via the communication link 15.

The A/V DEMUX 120 receives the single bitstream (which is composed of the encoded video bitstream generated by the video encoder 104 and the encoded audio bitstream generated by the audio data path 108), and performs audio/video demultiplexing upon the single encoded bitstream to separate the encoded video bitstream and the encoded audio bitstream, such that the encoded video bitstream and the encoded audio bitstream are forwarded to the bitstream buffer 126 and the audio data path 134, respectively. The bitstream buffer 126 receives the encoded video bitstream, and provides the encoded video bitstream to the video decoder 128. The encoded audio bitstream is decoded by the audio data path 134 to obtain audio data for audio playback. Regarding the video processing and playback, the video decoder 128 decodes the encoded video bitstream to reconstruct a video frame. The display buffer 130 receives decoded pixel data of the video frame from the video decoder 128, and provides the decoded pixel data of the video frame to the display engine 132. The display engine 132 is a driving circuit used to drive the display device 20 according to the decoded pixel data of the video frame. In the end, the video frame is displayed on the display device 20.

Any of source buffer 102, bitstream buffers 106, 126 and display buffer 130 may be implemented using an internal storage device, an external storage device, or a combination of an internal storage device and an external storage device. For example, the internal storage device may be a static random access memory (SRAM) or may be flip-flops; and the external storage device may be a dynamic random access memory (DRAM) or may be a flash memory.

Figure 2:
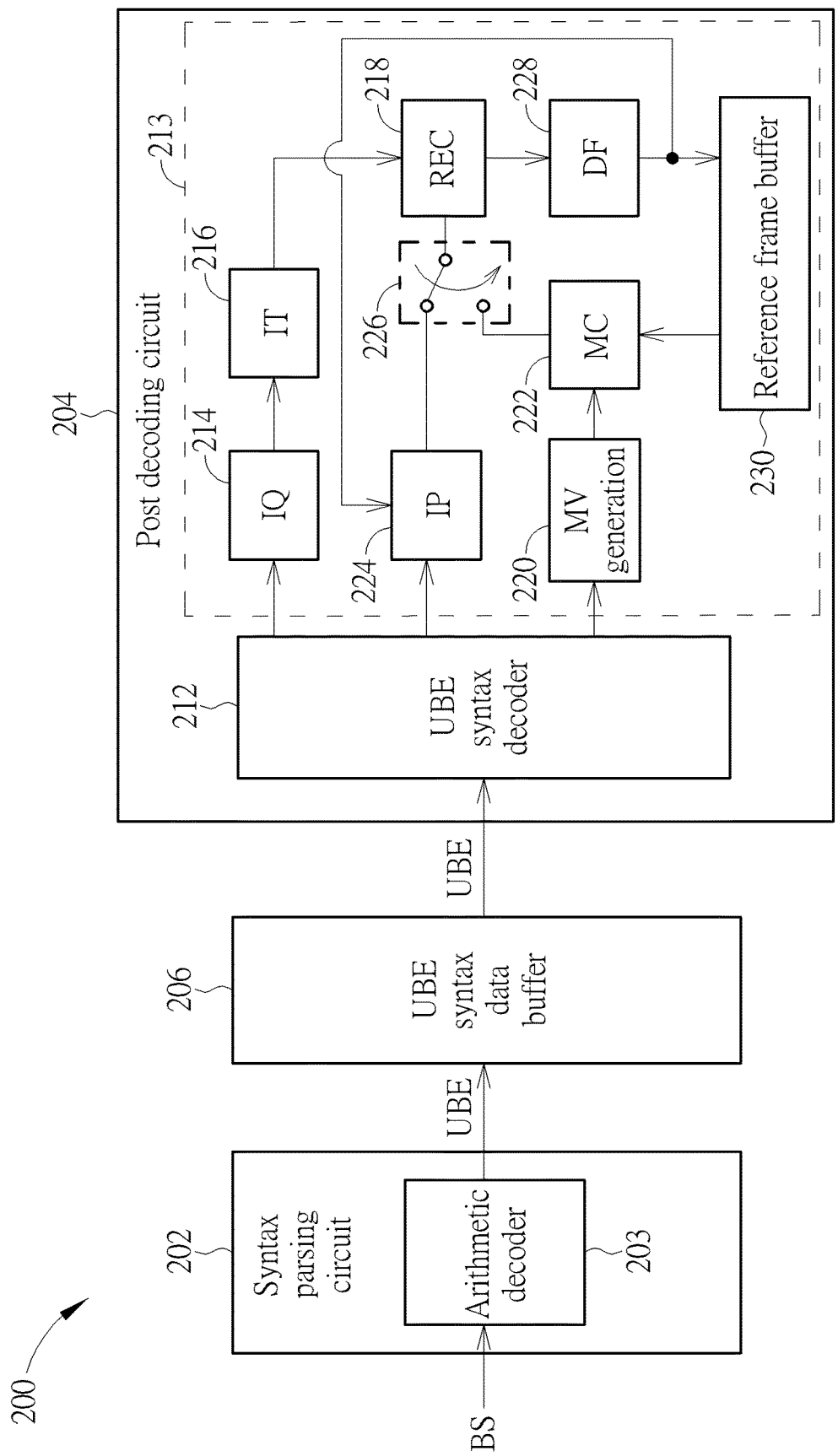
FIG. 2 is a diagram illustrating a video decoder according to an embodiment of the present invention.

In general, entropy decoding is a performance bottleneck of video decoding. In some embodiments of the present invention, the video decoder 128 may employ a two-phase syntax parsing scheme. FIG. 2 is a diagram illustrating a video decoder according to an embodiment of the present invention. The video decoder 128 shown in FIG. 1 may be implemented using the video decoder 200 shown in FIG. 2. The video decoder 200 employs a two-phase syntax parsing scheme, and includes a syntax parsing circuit 202 and a post decoding circuit 204. The syntax parsing circuit 202 transforms an arithmetic-encoded bitstream (e.g., data-dependency context-adaptive binary arithmetic coding (CABAC) entropy coding bitstream) into a non-data-dependency universal binary entropy (UBE) syntax bitstream, and the UBE syntax decoding in the post decoding circuit 204 can perform parallel UBE syntax decoding to achieve higher decoding performance.

The encoded video bitstream BS is an entropy encoding output of a video encoder (e.g., video encoder 104 of the video transmitting system 100). For example, the video encoder 104 may employ an arithmetic coding technique such as CABAC. Hence, the encoded video bitstream BS is an arithmetic-encoded bitstream (e.g., CABAC encoded bitstream). The arithmetic coding is often applied to bit strings generated after prediction and/or quantization. Also, various coding parameters and system configuration information may have to be transmitted. These coding parameters and system configuration information will be binarized into bin strings and then arithmetic-encoded. In short, the arithmetic coding usually is applied to bin strings associated with certain syntax elements such as motion vector difference (MVD), partition mode for a coding unit (CU), sign and absolute value of quantized transform coefficients of prediction residual, etc. As shown in FIG. 2, the syntax parsing circuit 202 has an arithmetic decoder 203. In accordance with the two-phase syntax parsing scheme, the arithmetic decoder 203 acts as a look-ahead bitstream reformatting processing circuit. The encoded video bitstream BS is fed into the arithmetic decoder 203. The encoded video bitstream BS is then arithmetic-decoded to recover a bin string (which is an arithmetic-decoded bin string). This arithmetic-decoded bin string is also referred as a non-arithmetic bin string or an UBE syntax data.

The UBE syntax data is stored into the UBE syntax data buffer 206. When enough UBE syntax data (arithmetic-decoded bin strings) have been buffered in the UBE syntax data buffer 206, the UBE syntax data is then read out from the UBE syntax data buffer 206 and post decoded by the post decoding circuit 204. As shown in FIG. 2, the post decoding circuit 204 includes a UBE syntax decoder (e.g., a variable length decoder (VLD) or a table look-up circuit) 212 and a processing circuit 213. The UBE syntax decoder 212 decodes the UBE syntax data to output decoded syntax data representing prediction residual, various coding parameters and system configuration information. That is, the decoded syntax data include a plurality of decoded syntax elements, wherein encoding-related data are represented by the decoded syntax elements. For example, the encoding-related data may include quantized transform coefficients, intra prediction data, motion data, control data, etc. The decoded syntax data will be provided to the processing circuit 213 to reconstruct pixel data of a video frame. For example, the processing circuit 213 may include an inverse quantization circuit (denoted by "IQ") 214, an inverse transform circuit (denoted by "IT") 216, a reconstruction circuit (denoted by"REC") 218, a motion vector calculation circuit (denoted by "MV generation") 220, a motion compensation circuit (denoted by "MC") 222, an intra prediction circuit (denoted by "IP") 224, an inter/intra mode selection circuit 226, an in-loop filter (e.g., a deblocking filter (DF) 228), and a reference frame buffer 230. Since a person skilled in the art should readily understand details of these circuit elements 214-230 included in the processing circuit 213, further description is omitted here for brevity.

The aforementioned two-phase syntax parsing scheme may be implemented using the arithmetic decoder proposed in the U.S. Patent Application No. 2016/0241854 A1, entitled "METHOD AND APPARATUS FOR ARITHMETIC DECODING" and incorporated herein by reference. The inventors of the U.S. Patent Application No. 2016/0241854 A1 are also co-authors of the instant application.

In one exemplary design, the UBE syntax data generated from the syntax parsing circuit 202 is an arithmetic-decoded bin string. For example, in HEVC standard, the syntax element last_sig_coeff_x_prefix specifies the prefix of the column position of the last significant coefficient in a scanning order within a transform block. According to the HEVC standard, the syntax element last_sig_coeff_x_prefix is arithmetic coded. Unary codes may be used for binarization of syntax element last_sig_coeff_x_prefix. An exemplary unary code for syntax element last_sig_coeff_x_prefix is shown in Table 1, where a longest code has 6 bits and the bin location is indicated by binIdx.

TABLE 1

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

At the encoder side, the prefix values prefixVal for the column position of the last significant coefficient in scanning order are binarized into respective bin strings. For example, the prefix value prefixVal equal to 3 is binarized into "1110".

Figure 3:
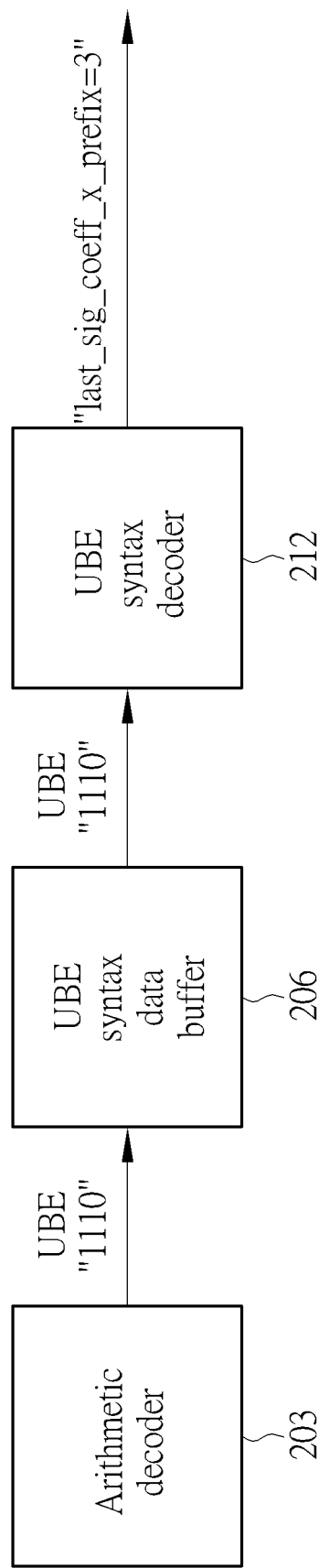
FIG. 3 illustrates a first example of a video decoder with two-phase syntax parsing according to an embodiment of the present invention.

The binarized bin strings are further encoded using arithmetic coding. According to an embodiment of the present invention, the arithmetic-encoded bitstream is processed by the arithmetic decoder 203 (which acts as a look-ahead bitstream reformatting processing circuit) at the decoder side as shown in FIG. 3. The arithmetic-decoded bin string "1110" from the arithmetic decoder 203 (which acts as a look-ahead bitstream reformatting processing circuit) will be stored in the UBE syntax data buffer 206. After enough bin strings are available, the stored bin string "1110" is then provided to UBE syntax decoder (e.g., VLD with no arithmetic decoding) 212 to recover the syntax value, i.e., last_sig_coeff_x_prefix=3.

Figure 4:
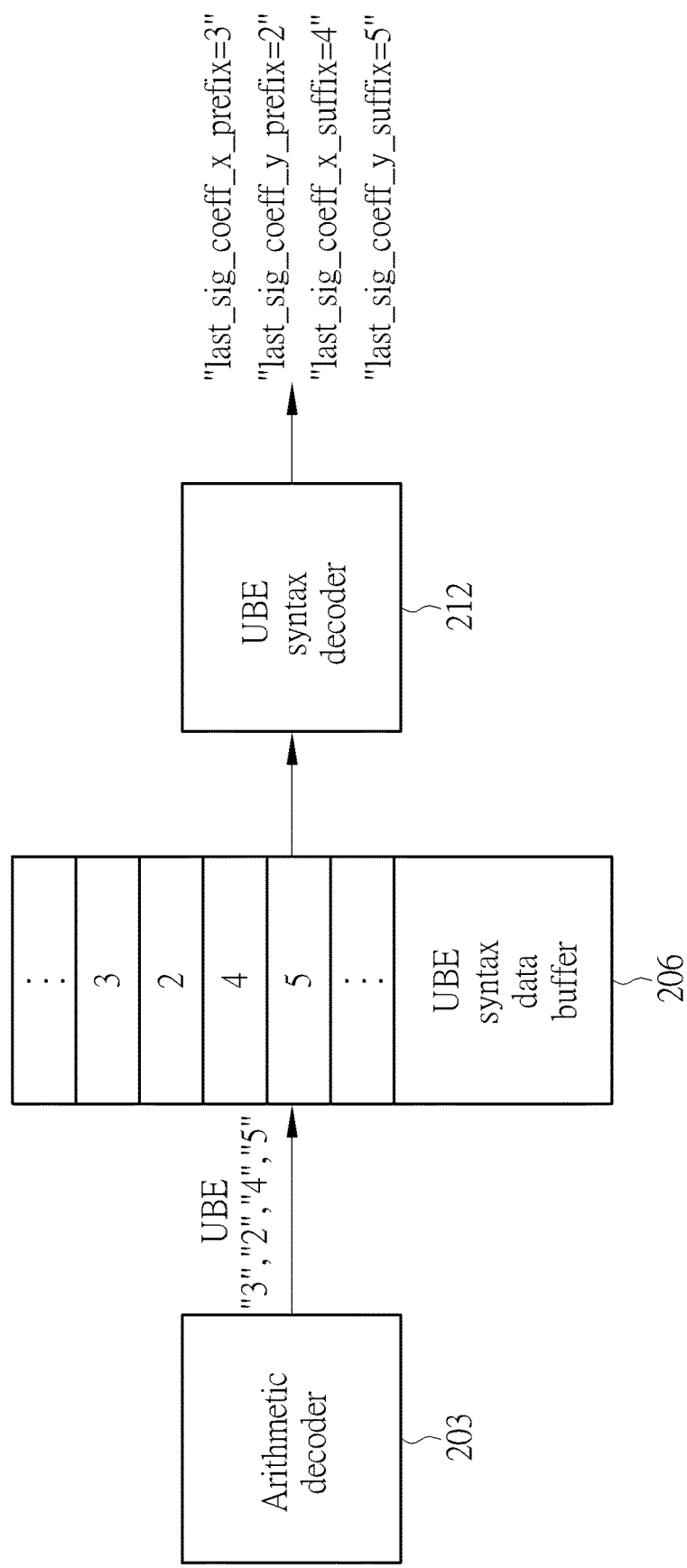
FIG. 4 illustrates a second example of a video decoder with two-phase syntax parsing according to an embodiment of the present invention.

Alternatively, the UBE syntax data generated from the syntax parsing circuit 202 may be composed of decoded syntax values (i.e., decoded syntax element values) with specific data structure in the UBE syntax data buffer 206. For example, in HEVC standard, syntax element last_sig_coeff_x_prefix specifies the prefix of the column position of the last significant coefficient in a scanning order within a transform block, syntax element last_sig_coeff_y_prefix specifies the prefix of the row position of the last significant coefficient in a scanning order within a transform block, syntax element last_sig_coeff_x_suffix specifies the suffix of the column position of the last significant coefficient in a scanning order within a transform block, and syntax element last_sig_coeff_y_suffix specifies the suffix of the row position of the last significant coefficient in a scanning order within a transform block. According to the HEVC standard, syntax elements last_sig_coeff_x_prefix, last_sig_coeff_y_prefix, last_sig_coeff_x_suffix, last_sig_coeff_y_suffix are arithmetic coded. According to an embodiment of the present invention, the arithmetic encoded bitstream is processed by the arithmetic decoder 203 (which acts as a look-ahead bitstream reformatting processing circuit) at the decoder side as shown in FIG. 4. The arithmetic-decoded syntax values "3", "2", "4", "5" of syntax elements last_sig_coeff_x_prefix, last_sig_coeff_y_prefix, last_sig_coeff_x_suffix, last_sig_coeff_y_suffix are obtained by the arithmetic decoder 203 (which acts as a look-ahead bitstream reformatting processing circuit) and stored into specific storage positions in the UBE syntax data buffer 206 according to the specific data structure. That is, a first particular storage space allocated in the UBE syntax data buffer 206 is dedicated to recording a decoded prefix value of syntax element last_sig_coeff_x_prefix, a second particular storage space allocated in the UBE syntax data buffer 206 is dedicated to recording a decoded prefix value of syntax element last_sig_coeff_y_prefix, a third particular storage space allocated in the UBE syntax data buffer 206 is dedicated to recording a decoded suffix value of syntax element last_sig_coeff_x_suffix, and a fourth particular storage space allocated in the UBE syntax data buffer 206 is dedicated to recording a decoded suffix value of syntax element last_sig_coeff_y_suffix. After enough syntax values are available, the stored syntax values "3", "2", "4", "5" are then provided to UBE syntax decoder (e.g., a table look-up circuit) 212 to finally recover the syntax, i.e., last_sig_coeff_x_prefix=3, last_sig_coeff_y_prefix=2, last_sig_coeff_x_suffix=4, and last_sig_coeff_y_suffix=5.

The arithmetic coding process is very data dependent and often causes decoding throughput concern. In order to overcome this issue, the two-phase syntax parsing scheme decouples the arithmetic decoding from the UBE syntax decoding (which is non-arithmetic decoding) by storing the UBE syntax data (which contains no arithmetic-encoded syntax data) into the UBE syntax data buffer 206. Since the UBE syntax decoder 212 is relatively simple compared to the arithmetic decoder 203, the system design only needs to focus on a throughput issue for the syntax parsing circuit 202.

Figure 5:
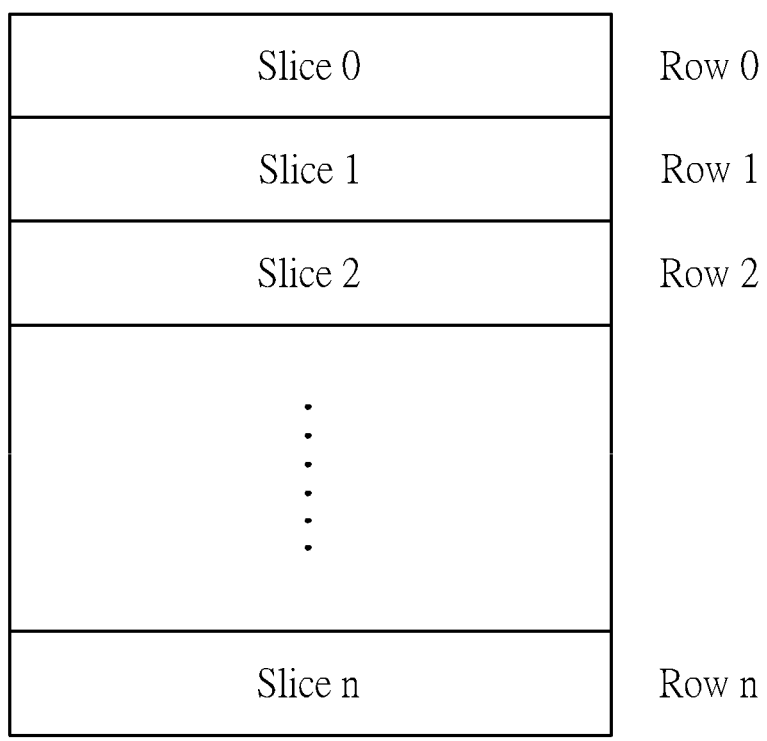
FIG. 5 is a diagram illustrating a first partitioning design of a video frame according to an embodiment of the present invention.

A coding block is a basic processing unit of a video coding standard. For example, when the video coding standard is H.264, one coding block is one macroblock (MB). For another example, when the video coding standard is VP9, one coding block is one super block (SB). For yet another example, when the video coding standard is HEVC (High Efficiency Video Coding), one coding block is one coding tree unit (CTU). One video frame may be partitioned into a plurality of slices, such that each of the slices includes a portion of the video frame. Since the common term "slice" is well defined in a variety of video coding standards, further description is omitted here for brevity. FIG. 5 is a diagram illustrating a first partitioning design of a video frame according to an embodiment of the present invention. One video frame IMG may have a plurality of coding block rows (e.g., MB rows, SB rows, or CTU rows) Row 0, Row 1, Row 2, . . . , Row n, each having a plurality of coding blocks (e.g., MBs, SBs, or CTUs). In accordance with the first partitioning design, each coding block row is one slice. Hence, the video frame IMG is partitioned into slices Slice 0, Slice 1, Slice 2, . . . , Slice n. FIG. 6 is a diagram illustrating a second partitioning design of a video frame according to an embodiment of the present invention. One video frame IMG may have a plurality of coding block rows (e.g., MB rows, SB rows, or CTU rows) Row 0, Row 1, Row 2, . . . , Row n, each having a plurality of coding blocks (e.g., MBs, SBs, or CTUs). In accordance with the second partitioning design, each coding block row contains a plurality of slices. Hence, the video frame IMG is partitioned into slices Slice 0,0-Slice 0,m, Slice 1,0-Slice 1,m, Slice 2,0-Slice 2,m, . . . , Slice n,0-Slice n,m. The video transmitting system 100 and the video receiving system 120 may be used under the premise that one video frame is partitioned into multiple slices, where a slice can contain partial or whole encoded data of one coding block row (e.g., MB/SB/CTU row), but cannot contain partial or whole encoded data of multiple coding block rows (e.g., MB/SB/CTU rows).

Figure 7:
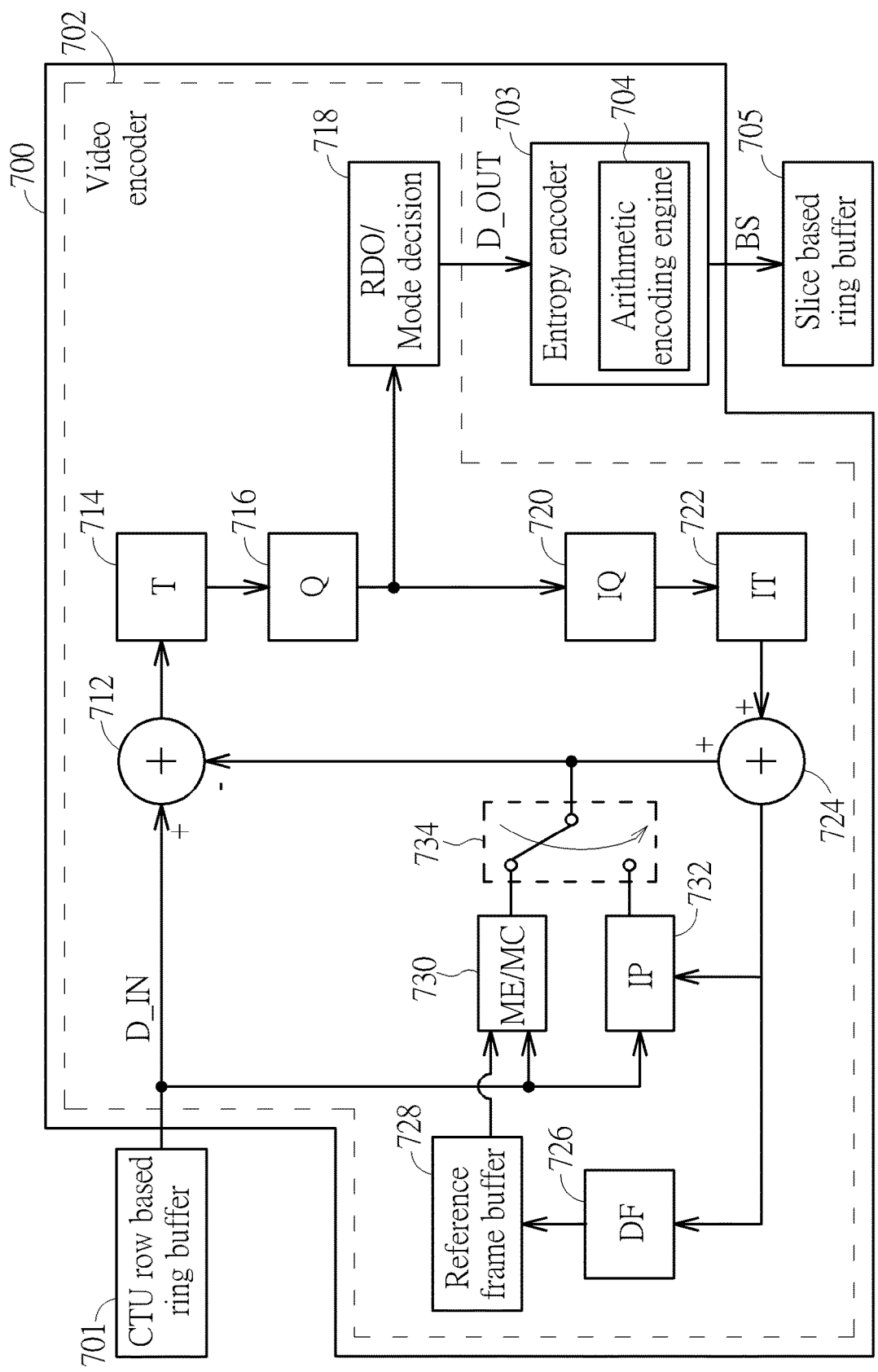
FIG. 7 is a diagram illustrating a video encoder according to an embodiment of the present invention.

The video encoder 104 included in the video transmitting system 100 may employ a coding block based pipeline structure (e.g., a CTU row based pipeline structure) to effectively reduce the encoding latency. For example, the video encoder 104 can start encoding of one CTU row in a video frame when pixel data of one CTU row are ready. FIG. 7 is a diagram illustrating a video encoder according to an embodiment of the present invention. The video encoder 104 shown in FIG. 1 may be implemented using the video encoder 700 shown in FIG. 7, the source buffer 102 shown in FIG. 1 may be implemented using the CTU row based ring buffer 701 shown in FIG. 7, and the bitstream buffer 106 shown in FIG. 1 may be implemented using the slice based ring buffer 705 shown in FIG. 7. The CTU row based ring buffer 701 is capable of storing source data of at least one CTU row, and the slice based ring buffer 705 is capable of storing encoded data of at least one slice. The video encoder 700 includes a processing circuit 702 and an entropy encoder 703. Due to inherent characteristics of ring buffers, a storage space in the CTU row based ring buffer 701 may be used to store pixel data of one CTU row in a video frame, and may be reused to store pixel data of another CTU row in the same video frame; and a storage space in the slice based ring buffer 705 may be used to store encoded pixel data of one slice in a video frame, and may be reused to store encoded pixel data of another slice in the same video frame.

The processing circuit 702 is used to process pixel data D_IN of a video frame (particularly, pixel data of one CTU in a video frame) to generate encoding-related data D_OUT, wherein the encoding-related data D_OUT may include at least quantized transform coefficients. The encoding-related data D_OUT may further include intra prediction data, in-loop filter control data, motion data and/or control data, depending upon the coding standard employed. In this example, the processing circuit 702 may include a residual generation circuit 712, a transform circuit (denoted by "T") 714, a quantization circuit (denoted by "Q") 716, a rate distortion optimization and mode decision circuit (denoted by "RDO/Mode decision") 718, an inverse quantization circuit (denoted by "IQ") 720, an inverse transform circuit (denoted by "IT") 722, a reconstruction circuit 724, an in-loop filter (e.g., a deblocking filter (DF) 726), a reference frame buffer 728, a motion estimation and motion compensation circuit (denoted by ME/MC) 730, an intra prediction circuit (denoted by "IP") 732, and an inter/intra mode selection circuit 734. Since a person skilled in the art should readily understand details of these circuit elements 712-734 included in the processing circuit 702, further description is omitted here for brevity.

The entropy encoder 703 has an arithmetic encoding engine 704 used to apply arithmetic encoding to the encoding-related data D_OUT (which may include at least quantized transform coefficients) generated from the processing circuit 702. For example, the arithmetic encoding engine 704 may be a CABAC encoder. Hence, the encoded video bitstream BS generated from the entropy encoder 703 is an arithmetic-encoded bitstream (e.g., CABAC encoded bitstream). The data of the encoded video bitstream BS is stored into the slice based ring buffer 705.

To achieve better decoding performance, the aforementioned two-phase syntax parsing scheme at the decoder part decouples the arithmetic decoding from the UBE syntax decoding (which is non-arithmetic decoding, such as Huffman decoding, Unary decoding or Exp-Golomb decoding). However, the latency caused by the arithmetic decoding of the two-phase syntax parsing scheme is not negligible. To further reduce the decoding latency for meeting a stringent requirement of an ultra-low latency application such as a VR application, the present invention further proposes a modified video encoder design and a modified video decoder design.

Figure 8:
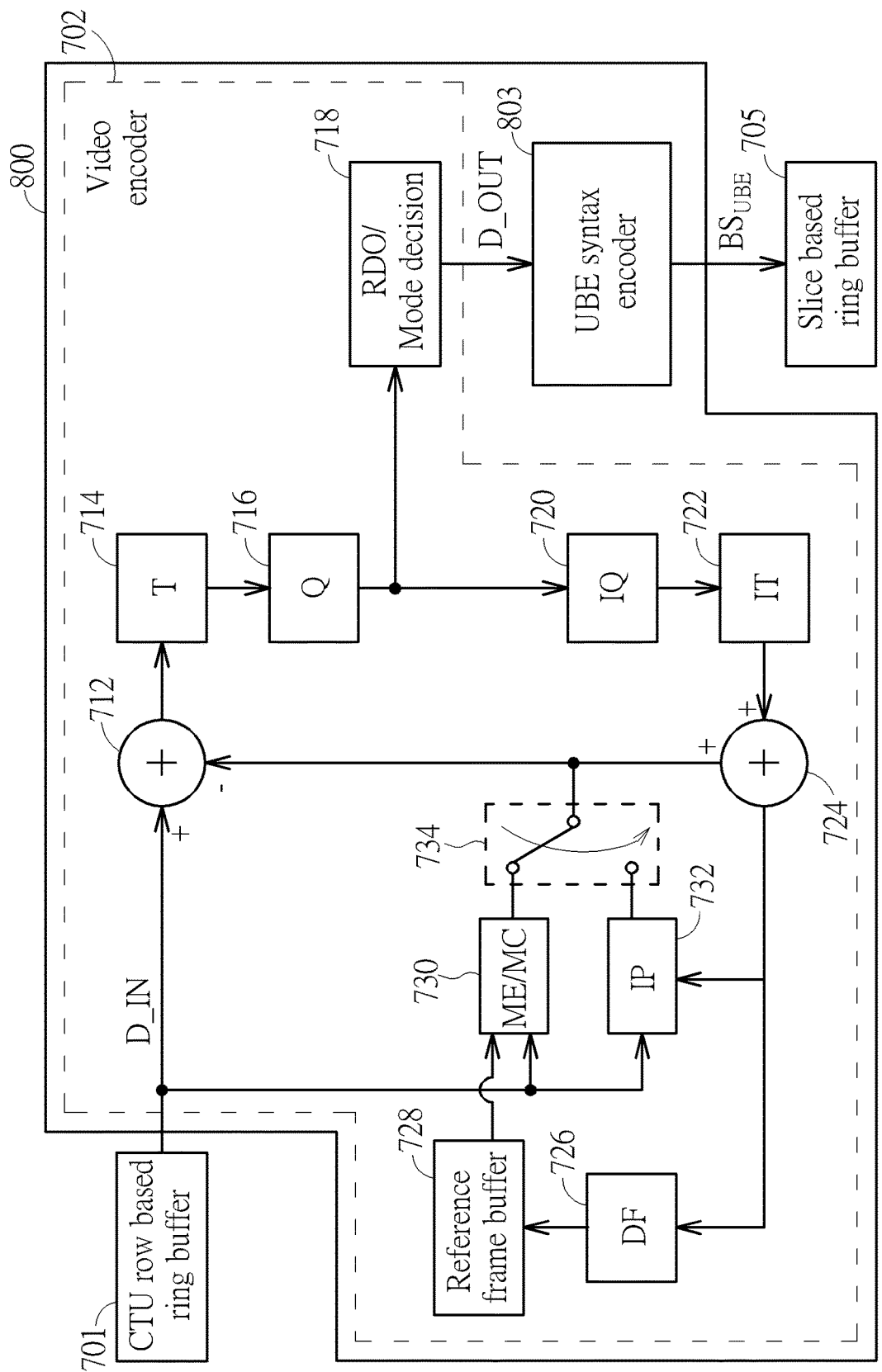
FIG. 8 is a diagram illustrating a modified video encoder according to an embodiment of the present invention.

FIG. 8 is a diagram illustrating a modified video encoder according to an embodiment of the present invention. The video encoder 104 shown in FIG. 1 may be implemented using the video encoder 800 shown in FIG. 8. The major difference between the video encoder 700 shown in FIG. 7 and the video encoder 800 shown in FIG. 8 is that the video encoder 800 employs a UBE syntax encoder 803. Hence, the UBE syntax encoder 803 is used to process a plurality of syntax elements to generate a video bitstream $BS_{UBE}$ that is composed of UBE syntax data. The encoding-related data D_OUT (which include at least quantized transform coefficients) generated from the processing circuit 702 are represented by the syntax elements. The UBE syntax encoder 803 may generate the UBE syntax data by applying non-arithmetic coding (e.g., Huffman coding, Unary coding or Exp-Golomb coding) to the syntax elements. It should be noted that the processing circuit 702 operates according to a video coding standard (e.g., HEVC), where the video coding standard supports arithmetic encoding (e.g., CABAC). However, the UBE syntax data generated from the UBE syntax encoder 803 contain no arithmetic-encoded syntax data due to the use of non-arithmetic coding.

Compared to the arithmetic encoding employed by the entropy encoder 703, the non-arithmetic coding (e.g., Huffman coding, Unary coding or Exp-Golomb coding) employed by the UBE syntax encoder 803 has faster processing speed and requires simpler hardware implementation. Hence, compared to the video encoder 700, the video encoder 800 has lower cost and lower latency.

Figure 9:
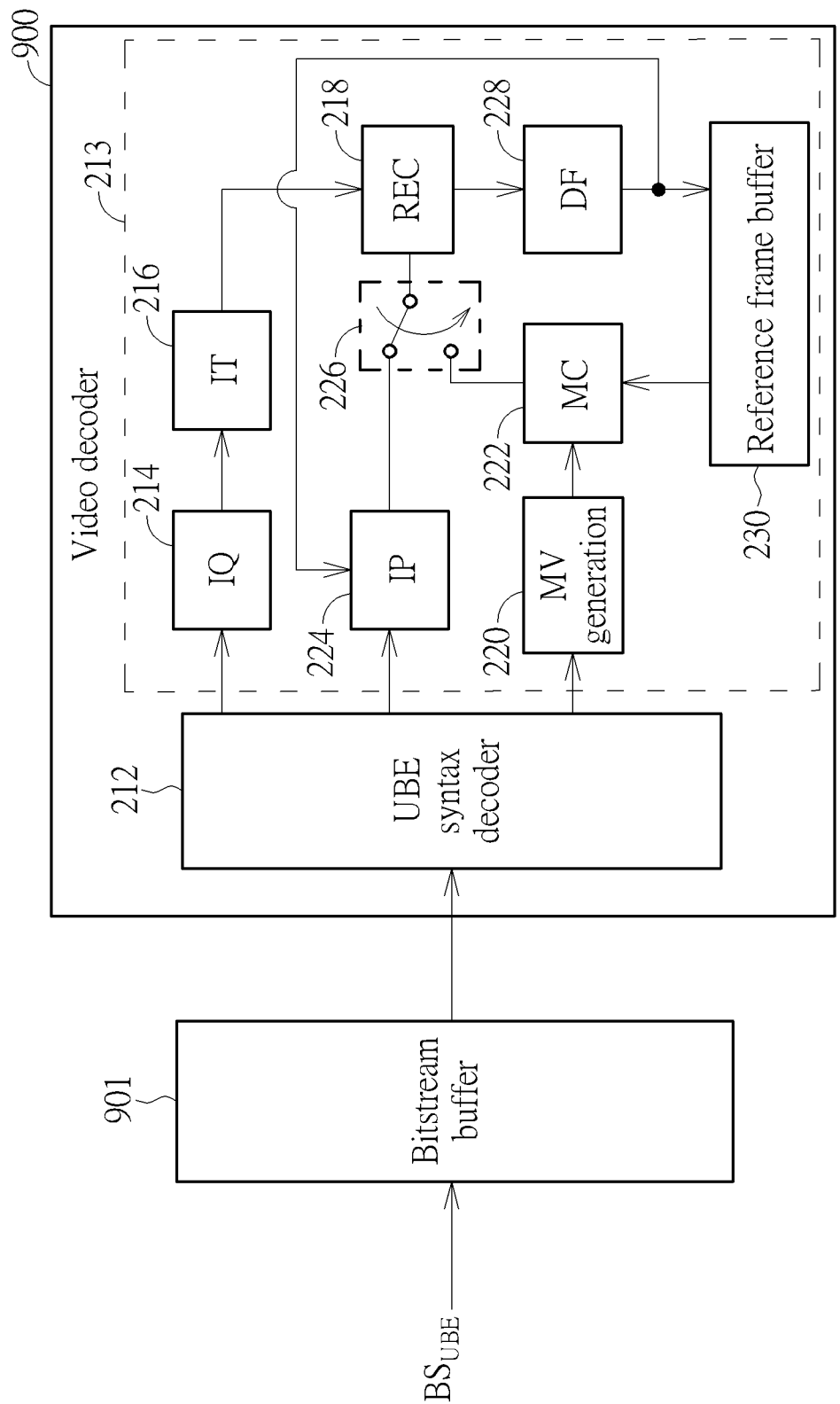
FIG. 9 is a diagram illustrating a modified video decoder according to an embodiment of the present invention.

FIG. 9 is a diagram illustrating a modified video decoder according to an embodiment of the present invention. The video decoder 128 shown in FIG. 1 may be implemented using the video decoder 900 shown in FIG. 9, and the bitstream buffer 126 shown in FIG. 1 may be implemented using the bitstream buffer 901 shown in FIG. 9. The major difference between the video decoder 200 shown in FIG. 2 and the video decoder 900 shown in FIG. 9 is that the video decoder 900 omits the syntax parsing circuit 202 (which uses the arithmetic decoder 203) and the UBE syntax data buffer 206. Hence, the video decoder 900 directly receives a video bitstream $BS_{UBE}$ composed of UBE syntax data from the bitstream buffer 901 (e.g., the slice based ring buffer 705 shown in FIG. 8). The UBE syntax decoder 212 processes UBE syntax data of the video bitstream $BS_{UBE}$ to generate a plurality of decoded syntax elements, wherein encoding-related data are represented by the decoded syntax elements, and include at least quantized transform coefficients. The encoding-related data may further include intra prediction data, in-loop filter control data, motion data and/or control data, depending upon the coding standard employed. The processing circuit 213 processes the encoding-related data to reconstruct pixel data of a video frame. It should be noted that the processing circuit 213 operates according to a video coding standard (e.g., HEVC), and the video coding standard supports arithmetic decoding (e.g., CABAC). However, the UBE syntax data fed into the UBE syntax decoder 212 contain no arithmetic-encoded syntax data.

Compared to the arithmetic decoding employed by the syntax parsing circuit 202 (which uses the arithmetic decoder 202), the non-arithmetic decoding (e.g., Huffman decoding, Unary decoding or Exp-Golomb decoding) employed by the UBE syntax decoder 212 has faster processing speed and requires simpler hardware implementation. Further, due to that fact that a two-phase parsing scheme is not used by the video decoder 900, the video decoder 900 does not need a UBE syntax data buffer between a syntax parser and a post decoder. Hence, compared to the video encoder 700, the video encoder 800 has lower cost and lower latency.

When the video transmitting system 100 and the video receiving system 120 shown in FIG. 1 are employed by a particular application (e.g., VR application), it is possible that the video transmitting system 100 may receive video frames from more than one video source 10. If the video transmitting system 100 has one video encoder 104 dedicated to serving a video encoding need of one video source and the video receiving system 120 has one video decoder 128 dedicated to serving a video decoding need of one video source, multiple sets of video encoder and decoder (CODEC) are used. However, this is not cost-efficient. The present invention proposes merging multiple video frames into a single video frame and then encoding the single video frame for data transmission. In this way, a single set of video encoder and decoder (CODEC) is capable of serving video encoding needs and video decoding needs of multiple video sources.

Figure 10:
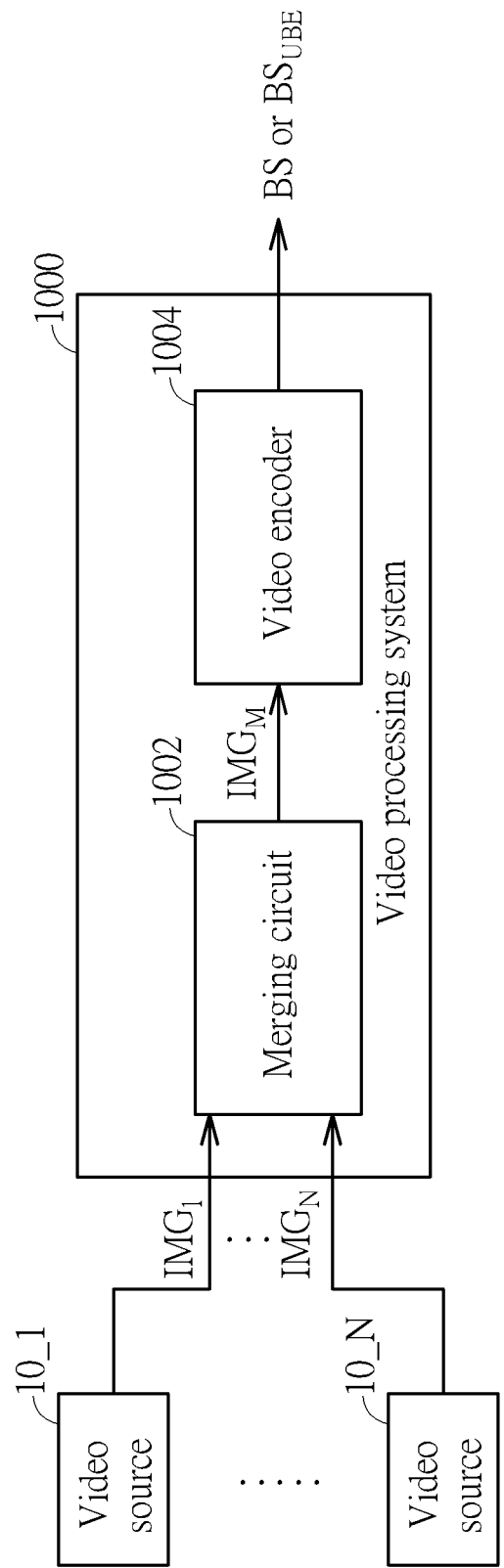
FIG. 10 is a diagram illustrating a video processing system according to an embodiment of the present invention.

FIG. 10 is a diagram illustrating a video processing system according to an embodiment of the present invention. The video processing system 1000 may be a part of a video transmitting system. As shown in FIG. 10, the video processing system 1000 includes a merging circuit 1002 and a video encoder 1004. In one exemplary design, the video encoder 1004 may be implemented using the video encoder 700 shown in FIG. 7. In another exemplary design, the video encoder 1004 may be implemented using the video encoder 800 shown in FIG. 8. The video processing system 1000 is coupled to a plurality of video sources 10_1-10_N (e.g., cameras or servers). The video sources 10_1-10_N may provide a plurality of input video frames IMG_1-IMG_N to the merging circuit 1002. For example, the input video frames IMG_1-IMG_N may be stored in a plurality of source buffers (not shown), and the merging circuit 1002 obtains the input video frames IMG_1-IMG_N from the source buffers. The merging circuit 1002 merges a plurality of video frames to create one merged video frame $IMG_M$, wherein the video frames included in the merged video frame $IMG_M$ are derived from the input video frames IMG_1-IMG_N, respectively. For example, one video frame included in the merged video frame $IMG_M$ may be an input video frame originally provided by one video source or may be a resized video frame generated by resizing an input video frame originally provided by one video source.

The merged video frame $IMG_M$ is a single video frame composed of pixel data derived from the input video frames IMG_1-IMG_N, and is fed into the video encoder 1004. When the video encoder 1004 is implemented using the video encoder 700 shown in FIG. 7, the encoded video bitstream BS that contains arithmetic-encoded data is generated for the merged video frame $IMG_M$. When the video encoder 1004 is implemented using the video encoder 800 shown in FIG. 8, the video bitstream $BS_{UBE}$ that contains no arithmetic-encoded data is generated for the merged video frame $IMG_M$.

In some embodiments of the present invention, the video sources 10_1-10_N may be cameras that capture the input video frames IMG_1-IMG_N at the same time. Hence, the input video frames IMG_1-IMG_N to be merged into a single video frame may have the same timestamp. Since each merged video frame is composed of input video frames having the same timestamp, it is easy to do time synchronization between different video sources.

The input video frames IMG_1-IMG_N are provided by different video sources 10_1-10_N. Hence, sizes of the input video frames IMG_1-IMG_N are not necessarily the same. The merging circuit 1002 may employ a merging scheme to combine the input video frames IMG_1-IMG_N.

Figure 11:
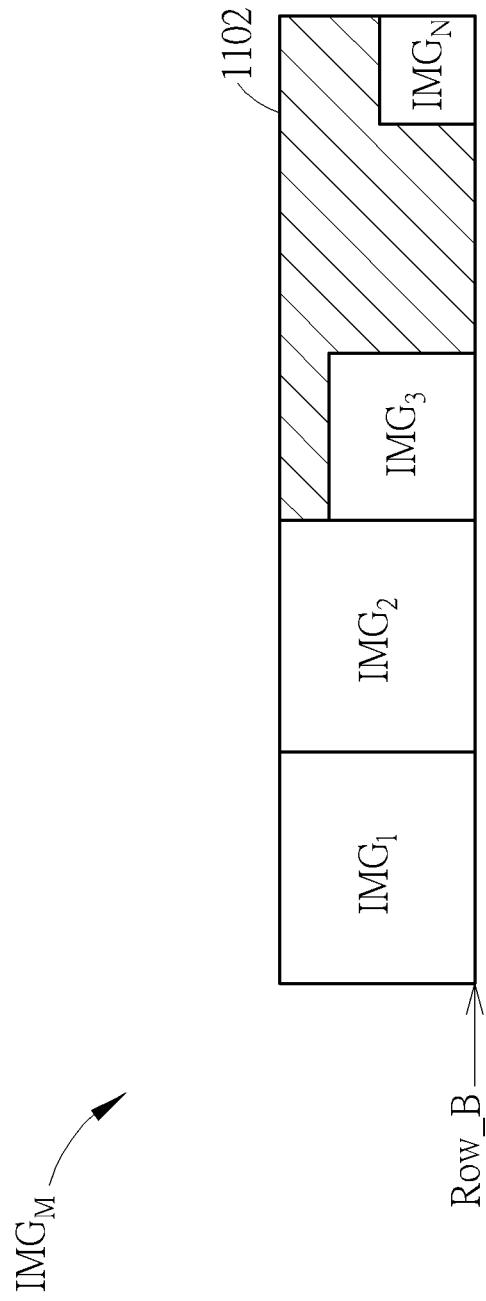
FIG. 11 is a diagram illustrating a first merging scheme according to an embodiment of the present invention.

FIG. 11 is a diagram illustrating a first merging scheme according to an embodiment of the present invention. As shown in FIG. 11, video frames included in the merged video frame $IMG_M$ are input video frame $IMG_1$-$IMG_N$ originally provided by the video sources 10_1-10_N. In addition, bottoms of the input video frame $IMG_1$-$IMG_N$ are aligned with the bottom of the merged video frame $IMG_M$. As shown in FIG. 11, a lowermost pixel row of a first video frame (e.g., input video frame $IMG_1$) included in the merged video frame $IMG_M$ is a first part of a lowermost pixel row Row_B of the merged video frame $IMG_M$, a lowermost pixel row of a second video frame (e.g., input video frame $IMG_2$) included in the merged video frame $IMG_M$ is a second part of the lowermost pixel row Row_B of the merged video frame $IMG_M$, a lowermost pixel row of a third video frame (e.g., input video frame $IMG_3$) included in the merged video frame $IMG_M$ is a third part of the lowermost pixel row Row_B of the merged video frame $IMG_M$, and a lowermost pixel row of an $N^{th}$ video frame (e.g., input video frame $IMG_N$) included in the merged video frame $IMG_{M\ is\ an\ N}^{th}$ part of the lowermost pixel row Row_B of the merged video frame $IMG_M$. Since heights of the input video frames $IMG_1$-$IMG_N$ are not necessarily the same, the merged video frame $IMG_M$ has a region 1102 not occupied by any of the input video frames $IMG_1$-$IMG_N$. To improve the coding efficiency, all dummy pixels filled in the region 1102 may be intentionally set by the same pixel value.

Figure 12:
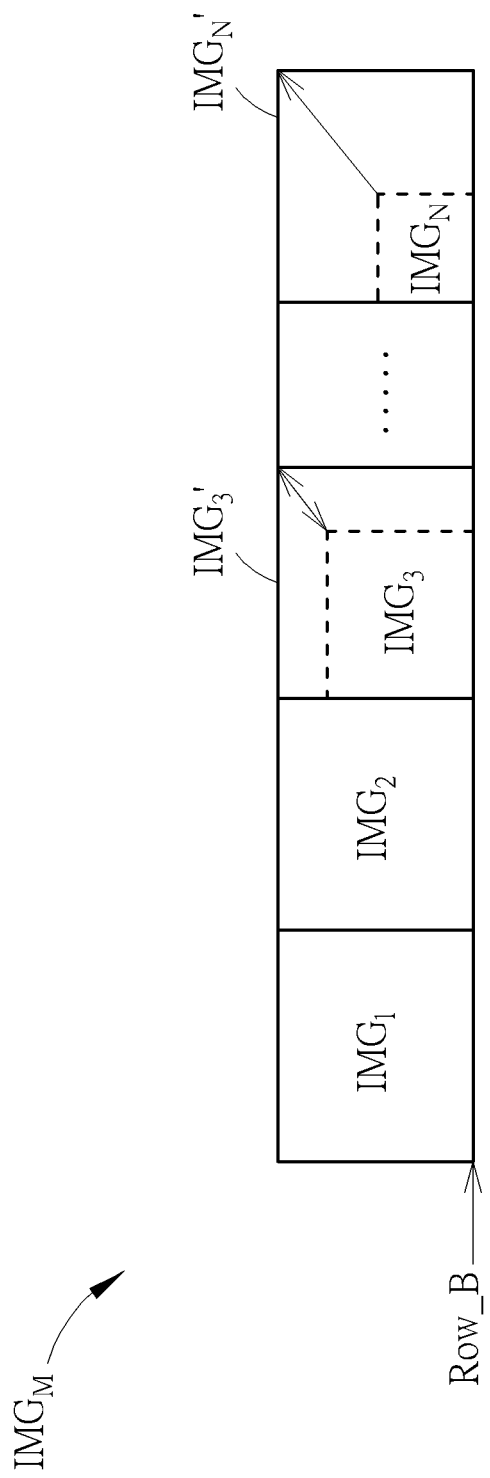
FIG. 12 is a diagram illustrating a second merging scheme according to an embodiment of the present invention.

FIG. 12 is a diagram illustrating a second merging scheme according to an embodiment of the present invention. As shown in FIG. 12, video frames included in the merged video frame $IMG_M$ contain resized video frames each generated from the merging circuit 1102 by resizing one input video frame originally provided by one video source. In addition, bottoms of the video frames (which contain resized video frames) are aligned with the bottom of the merged video frame $IMG_M$. As shown in FIG. 12, a lowermost pixel row of a first video frame (e.g., input video frame $IMG_1$) included in the merged video frame $IMG_M$ is a first part of a lowermost pixel row Row_B of the merged video frame $IMG_M$, a lowermost pixel row of a second video frame (e.g., input video frame $IMG_2$) included in the merged video frame $IMG_M$ is a second part of the lowermost pixel row Row_B of the merged video frame $IMG_M$, a lowermost pixel row of a third video frame (e.g., resized video frame $IMG_3'$ generated from resizing input video frame $IMG_3$) included in the merged video frame $IMG_M$ is a third part of the lowermost pixel row Row_B of the merged video frame $IMG_M$, and a lowermost pixel row of an $N^{th}$ video frame (e.g., resized video frame $IMG_N'$ generated from resizing input video frame $IMG_N$) included in the merged video frame $IMG_M$ is an $N^{th}$ part of the lowermost pixel row Row_B of the merged video frame $IMG_M$. In this example, the height of each resized video frame is equal to the height of the merged video frame $IMG_M$. However, this is for illustrative purposes only, and is not meant to be a limitation of the present invention. In practice, a resizing ratio of an input video frame may be adjusted, depending upon actual design considerations.

Figure 13:
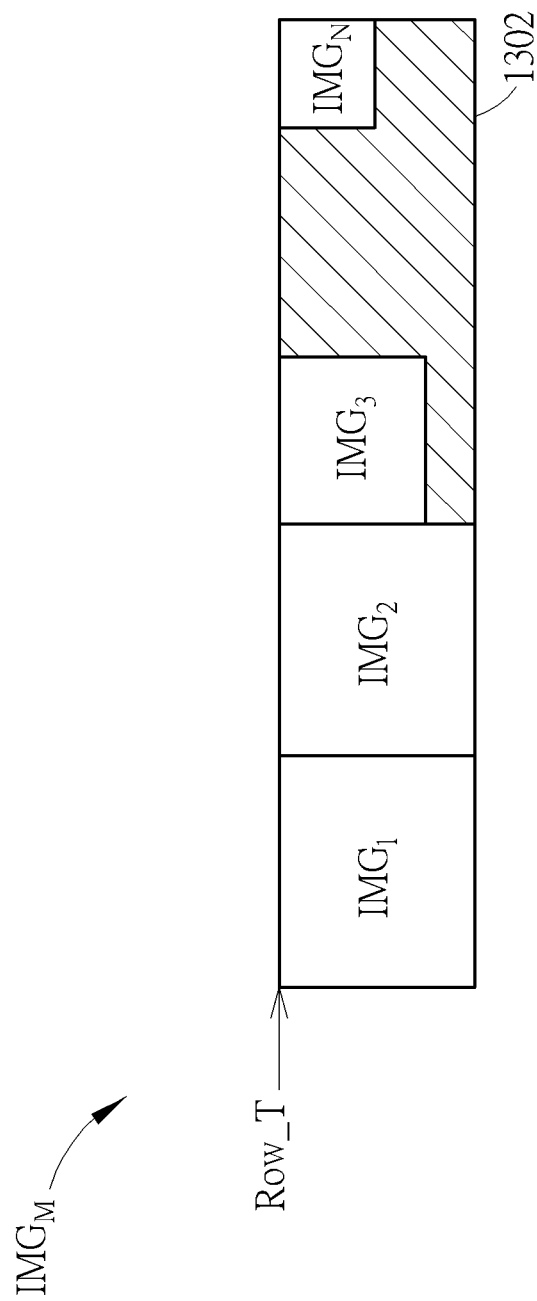
FIG. 13 is a diagram illustrating a third merging scheme according to an embodiment of the present invention.

FIG. 13 is a diagram illustrating a third merging scheme according to an embodiment of the present invention. As shown in FIG. 13, video frames included in the merged video frame $IMG_M$ are input video frame $IMG_1$-$IMG_N$ originally provided by the video sources 10_1-10_N. In addition, tops of the input video frame $IMG_1$-$IMG_N$ are aligned with the top of the merged video frame $IMG_M$. As shown in FIG. 13, an uppermost pixel row of a first video frame (e.g., input video frame $IMG_1$) included in the merged video frame $IMG_M$ is a first part of an uppermost pixel row Row_T of the merged video frame $IMG_M$, an uppermost pixel row of a second video frame (e.g., input video frame $IMG_2$) included in the merged video frame $IMG_M$ is a second part of the uppermost pixel row Row_T of the merged video frame $IMG_M$, an uppermost pixel row of a third video frame (e.g., input video frame $IMG_3$) included in the merged video frame $IMG_M$ is a third part of the uppermost pixel row Row_T of the merged video frame $IMG_M$, and an uppermost pixel row of an $N^{th}$ video frame (e.g., input video frame $IMG_N$) included in the merged video frame $IMG_M$ is an $N^{th}$ part of the uppermost pixel row Row_T of the merged video frame $IMG_M$. Since heights of the input video frames $IMG_1$-$IMG_N$ are not necessarily the same, the merged video frame $IMG_M$ has a region 1302 not occupied by any of the input video frames $IMG_1$-$IMG_N$. To improve the coding efficiency, all dummy pixels filled in the region 1302 may be intentionally set by the same pixel value.

Figure 14:
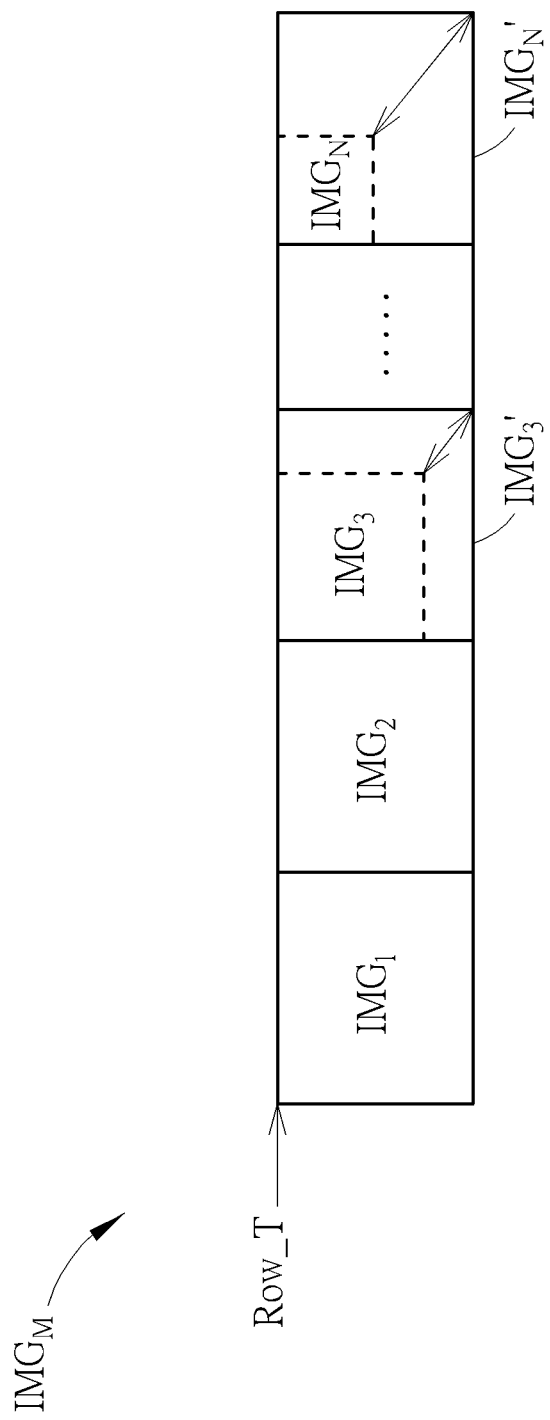
FIG. 14 is a diagram illustrating a fourth merging scheme according to an embodiment of the present invention.

FIG. 14 is a diagram illustrating a fourth merging scheme according to an embodiment of the present invention. As shown in FIG. 14, video frames included in the merged video frame $IMG_M$ contain resized video frames each generated from the merging circuit 1102 by resizing one input video frame originally provided by one video source. In addition, tops of the video frames (which contain resized video frames) are aligned with the top of the merged video frame $IMG_M$. As shown in FIG. 14, an uppermost pixel row of a first video frame (e.g., input video frame $IMG_1$) included in the merged video frame $IMG_M$ is a first part of an uppermost pixel row Row_T of the merged video frame $IMG_M$, an uppermost pixel row of a second video frame (e.g., input video frame $IMG_2$) included in the merged video frame $IMG_M$ is a second part of the uppermost pixel row Row_T of the merged video frame $IMG_M$, an uppermost pixel row of a third video frame (e.g., resized video frame $IMG_3'$ generated from resizing input video frame $IMG_3$) included in the merged video frame $IMG_M$ is a third part of the uppermost pixel row Row_T of the merged video frame $IMG_M$, and an uppermost pixel row of an $N^{th}$ video frame (e.g., resized video frame $IMG_N'$ generated from resizing input video frame $IMG_N$) included in the merged video frame $IMG_M$ is an $N^{th}$ part of the uppermost pixel row Row_T of the merged video frame $IMG_M$. In this example, the height of each resized video frame is equal to the height of the merged video frame $IMG_M$. However, this is for illustrative purposes only, and is not meant to be a limitation of the present invention. In practice, a resizing ratio of an input video frame may be adjusted, depending upon actual design considerations.

Figure 15:
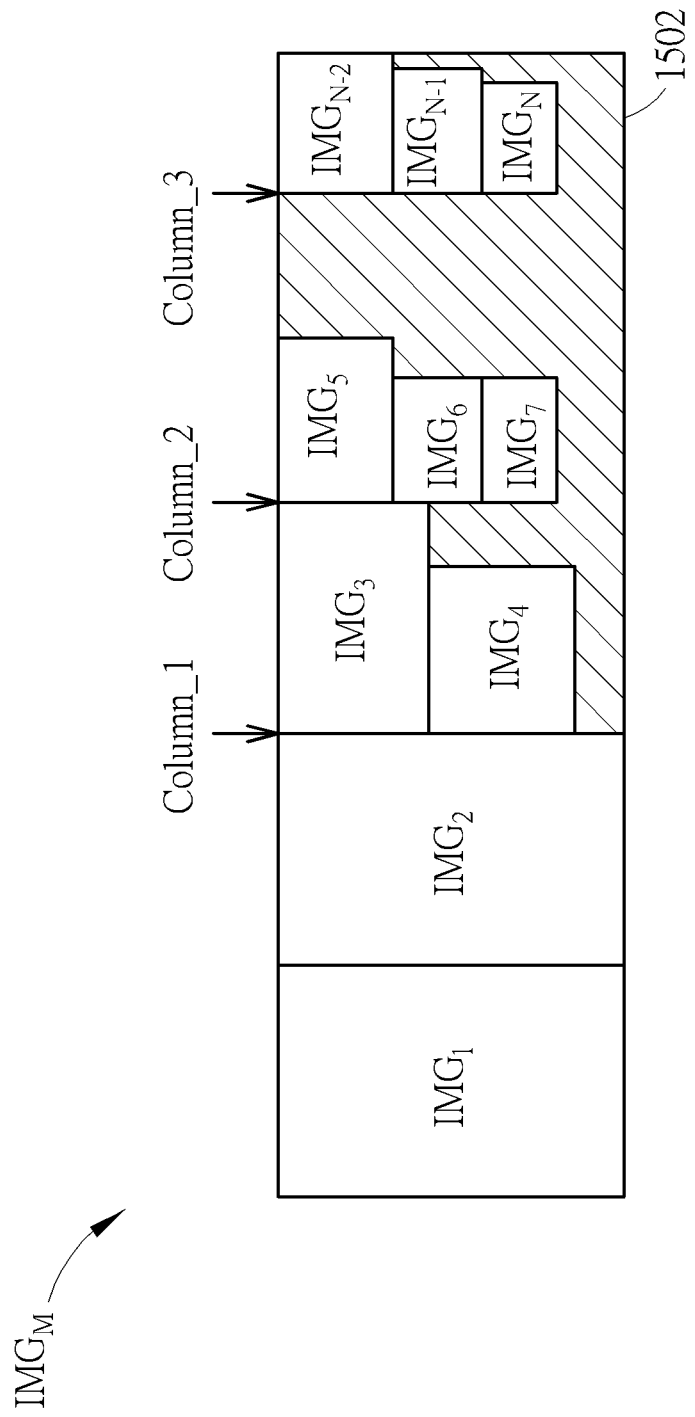
FIG. 15 is a diagram illustrating a fifth merging scheme according to an embodiment of the present invention.

FIG. 15 is a diagram illustrating a fifth merging scheme according to an embodiment of the present invention. As shown in FIG. 15, video frames included in the merged video frame $IMG_M$ are input video frame $IMG_1$-$IMG_N$ originally provided by the video sources 10_1-10_N. In accordance with the fifth merging scheme, the video frames are patched to form the merged video frame $IMG_M$. Hence, some video frames are merged in a vertical direction of the merged video frame $IMG_M$. In this example, left sides of some of the input video frame $IMG_1$-$IMG_N$ are aligned with the same pixel column of the merged video frame $IMG_M$. As shown in FIG. 15, a leftmost pixel row of one video frame (e.g., input video frame $IMG_3$) included in the merged video frame $IMG_M$ is a first part of a first pixel column Column_1 of the merged video frame $IMG_M$, and a leftmost pixel row of another video frame (e.g., input video frame $IMG_4$) included in the merged video frame $IMG_M$ is a second part of the first pixel column Column_1 of the merged video frame $IMG_M$; a leftmost pixel row of one video frame (e.g., input video frame $IMG_5$) included in the merged video frame $IMG_M$ is a first part of a second pixel column Column_2 of the merged video frame $IMG_M$, a leftmost pixel row of another video frame (e.g., input video frame $IMG_6$) included in the merged video frame $IMG_M$ is a second part of the second pixel column Column_2 of the merged video frame $IMG_M$, and a leftmost pixel row of yet another video frame (e.g., input video frame $IMG_M$) included in the merged video frame $IMG_M$ is a third part of the second pixel column Column_2 of the merged video frame $IMG_M$; and a leftmost pixel row of one video frame (e.g., input video frame $IMG_{N-2}$) included in the merged video frame $IMG_M$ is a first part of a third pixel column Column_3 of the merged video frame $IMG_M$, a leftmost pixel row of another video frame (e.g., input video frame $IMG_{N-1}$) included in the merged video frame $IMG_M$ is a second part of the third pixel column Column_3 of the merged video frame $IMG_M$, and a leftmost pixel row of yet another video frame (e.g., input video frame $IMG_N$) included in the merged video frame $IMG_M$ is a third part of the third pixel column Column_3 of the merged video frame $IMG_M$. Since widths of the input video frames $IMG_1$-$IMG_N$ are not necessarily the same, the merged video frame $IMG_M$ has a region 1502 not occupied by any of the input video frames $IMG_1$-$IMG_N$. To improve the coding efficiency, all dummy pixels filled in the region 1502 may be intentionally set by the same pixel value.

Figure 16:
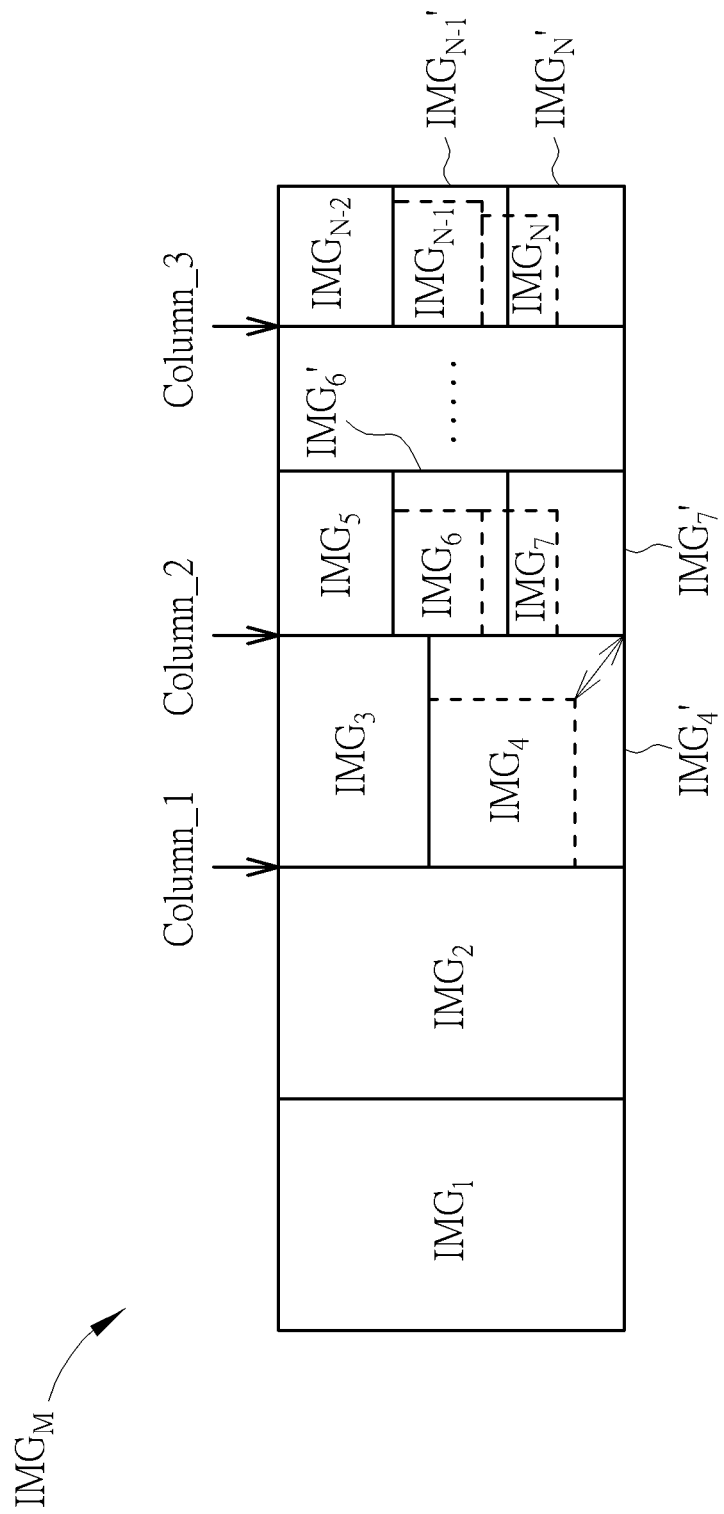
FIG. 16 is a diagram illustrating a sixth merging scheme according to an embodiment of the present invention.

FIG. 16 is a diagram illustrating a sixth merging scheme according to an embodiment of the present invention. As shown in FIG. 16, video frames included in the merged video frame $IMG_M$ contain resized video frames each generated from the merging circuit 1102 by resizing one input video frame originally provided by one video source. In accordance with the sixth merging scheme, the video frames (which contain resized video frames) are patched to form the merged video frame $IMG_M$. Hence, some of the video frames (which contain resized video frames) are merged in a vertical direction of the merged video frame $IMG_M$. In this example, left sides of some of the video frames (which contain resized video frames) are aligned with the same pixel column of the merged video frame $IMG_M$. As shown in FIG. 16, a leftmost pixel row of one video frame (e.g., input video frame $IMG_3$) included in the merged video frame $IMG_M$ is a first part of a first pixel column Column_1 of the merged video frame $IMG_M$, and a leftmost pixel row of another video frame (e.g., resized video frame $IMG_4'$ derived from resizing input video frame $IMG_4$) included in the merged video frame $IMG_M$ is a second part of the first pixel column Column_1 of the merged video frame $IMG_M$; a leftmost pixel row of one video frame (e.g., input video frame $IMG_5$) included in the merged video frame $IMG_M$ is a first part of a second pixel column Column_2 of the merged video frame $IMG_M$, a leftmost pixel row of another video frame (e.g., resized video frame $IMG_6'$ derived from resizing input video frame $IMG_6$) included in the merged video frame $IMG_M$ is a second part of the second pixel column Column_2 of the merged video frame $IMG_M$, and a leftmost pixel row of yet another video frame (i.e., resized video frame $IMG_7'$ derived from resizing input video frame $IMG_M$) included in the merged video frame $IMG_M$ is a third part of the second pixel column Column_2 of the merged video frame $IMG_M$; and a leftmost pixel row of one video frame (e.g., input video frame $IMG_{N-2}$) included in the merged video frame $IMG_M$ is a first part of a third pixel column Column_3 of the merged video frame $IMG_M$, a leftmost pixel row of another video frame (e.g., resized video frame $IMG_{N-1}'$ derived from resizing input video frame $IMG_{N-1}$) included in the merged video frame $IMG_M$ is a second part of the third pixel column Column_3 of the merged video frame $IMG_M$, and a leftmost pixel row of yet another video frame (e.g., resized video frame $IMG_N$ derived from resizing input video frame $IMG_N$) included in the merged video frame $IMG_M$ is a third part of the third pixel column Column_3 of the merged video frame $IMG_M$. In this example, concerning video frames having left sides aligned with the same pixel column of the merged video frame $IMG_M$, the width of each resized video frame is equal to the width of one input video frame originally provided by one video source. However, this is for illustrative purposes only, and is not meant to be a limitation of the present invention. In practice, a resizing ratio of an input video frame may be adjusted, depending upon actual design considerations.

Figure 17:
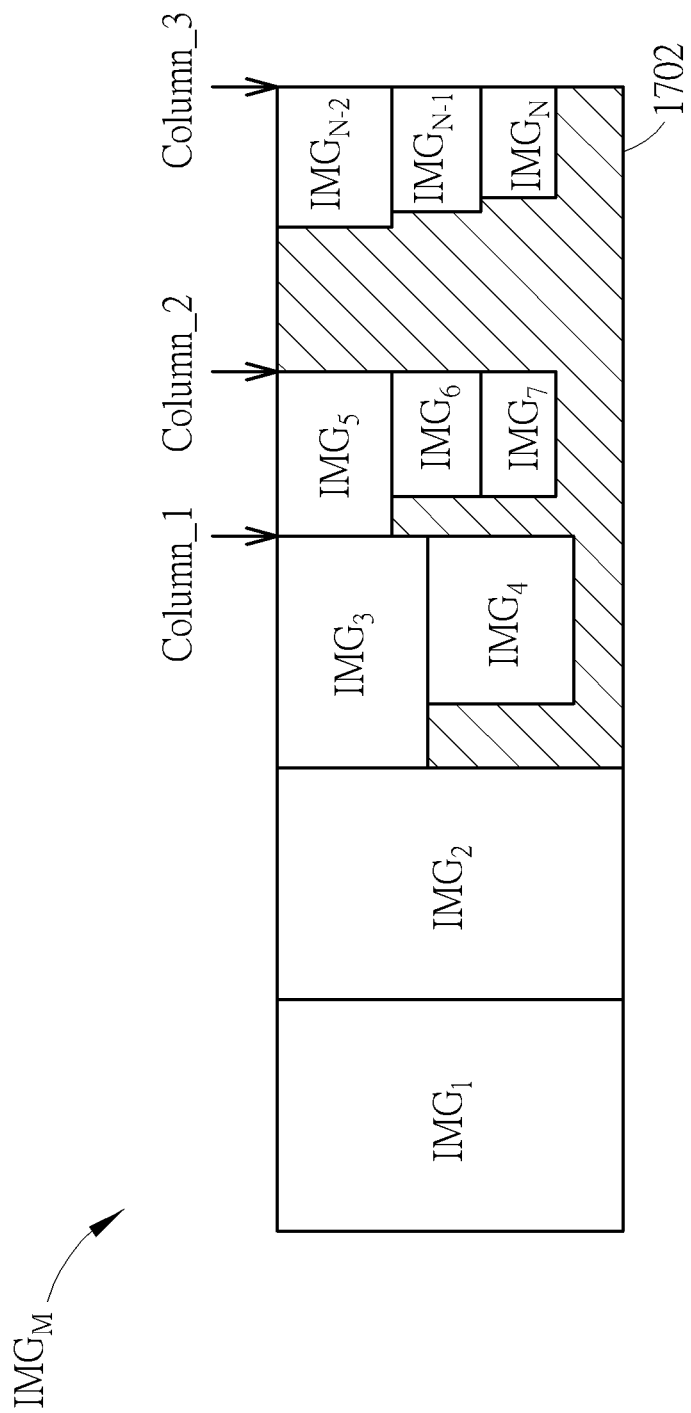
FIG. 17 is a diagram illustrating a seventh merging scheme according to an embodiment of the present invention.

FIG. 17 is a diagram illustrating a seventh merging scheme according to an embodiment of the present invention. As shown in FIG. 17, video frames included in the merged video frame $IMG_M$ are input video frame $IMG_1$-$IMG_N$ originally provided by the video sources 10_1-10_N. In accordance with the seventh merging scheme, the video frames are patched to form the merged video frame $IMG_M$. Hence, some video frames are merged in a vertical direction of the merged video frame $IMG_M$. In this example, right sides of some of the input video frame $IMG_1$-$IMG_N$ are aligned with the same pixel column of the merged video frame $IMG_M$. As shown in FIG. 17, a rightmost pixel row of one video frame (e.g., input video frame $IMG_3$) included in the merged video frame $IMG_M$ is a first part of a first pixel column Column_1 of the merged video frame $IMG_M$, and a rightmost pixel row of another video frame (e.g., input video frame $IMG_4$) included in the merged video frame $IMG_M$ is a second part of the first pixel column Column_1 of the merged video frame $IMG_M$; a rightmost pixel row of one video frame (e.g., input video frame $IMG_5$) included in the merged video frame $IMG_M$ is a first part of a second pixel column Column_2 of the merged video frame $IMG_M$, a rightmost pixel row of another video frame (e.g., input video frame $IMG_6$) included in the merged video frame $IMG_M$ is a second part of the second pixel column Column_2 of the merged video frame $IMG_M$, and a rightmost pixel row of yet another video frame (e.g., input video frame $IMG_M$) included in the merged video frame $IMG_M$ is a third part of the second pixel column Column_2 of the merged video frame $IMG_M$; and a rightmost pixel row of one video frame (e.g., input video frame $IMG_{N-2}$) included in the merged video frame $IMG_M$ is a first part of a third pixel column Column_3 of the merged video frame $IMG_M$, a rightmost pixel row of another video frame (e.g., input video frame $IMG_{N-1}$) included in the merged video frame $IMG_M$ is a second part of the third pixel column Column_3 of the merged video frame $IMG_M$, and a rightmost pixel row of yet another video frame (e.g., input video frame $IMG_N$) included in the merged video frame $IMG_M$ is a third part of the third pixel column Column_3 of the merged video frame $IMG_M$. Since widths of the input video frames $IMG_1$-$IMG_N$ are not necessarily the same, the merged video frame $IMG_M$ has a region 1702 not occupied by any of the input video frames $IMG_1$-$IMG_N$. To improve the coding efficiency, all dummy pixels filled in the region 1702 may be intentionally set by the same pixel value.

Figure 18:
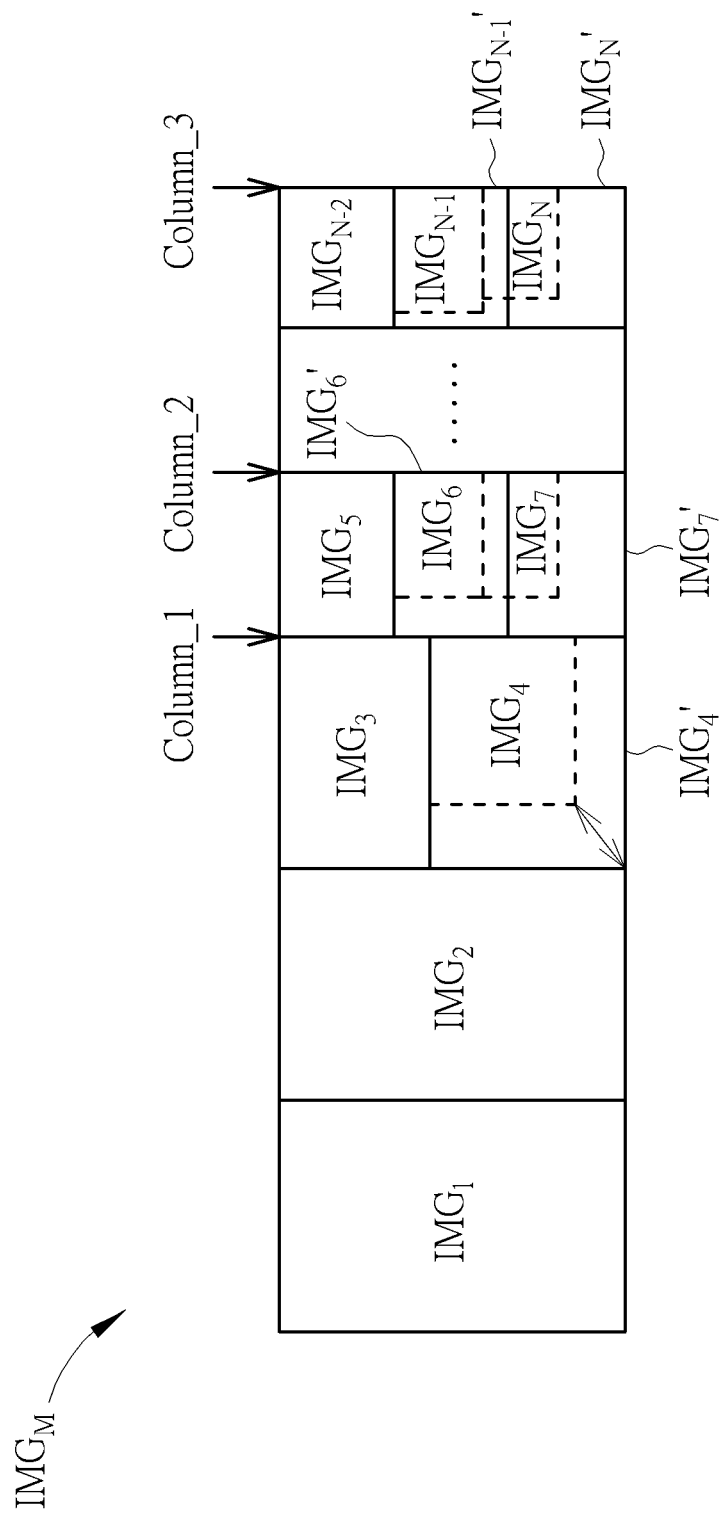
FIG. 18 is a diagram illustrating an eighth merging scheme according to an embodiment of the present invention.

FIG. 18 is a diagram illustrating an eighth merging scheme according to an embodiment of the present invention. As shown in FIG. 18, video frames included in the merged video frame $IMG_M$ contain resized video frames each generated from the merging circuit 1102 by resizing one input video frame originally provided by one video source. In accordance with the eighth merging scheme, the video frames (which contain resized video frames) are patched to form the merged video frame $IMG_M$. Hence, some of the video frames (which contain resized video frames) are merged in a vertical direction of the merged video frame $IMG_M$. In this example, right sides of some of the video frames (which contain resized video frames) are aligned with the same pixel column of the merged video frame $IMG_M$. As shown in FIG. 18, a rightmost pixel row of one video frame (e.g., input video frame $IMG_3$) included in the merged video frame $IMG_M$ is a first part of a first pixel column Column_1 of the merged video frame $IMG_M$, and a rightmost pixel row of another video frame (e.g., resized video frame $IMG_4'$ generated from resizing input video frame $IMG_4$) included in the merged video frame $IMG_M$ is a second part of the first pixel column Column_1 of the merged video frame $IMG_M$; a rightmost pixel row of one video frame (e.g., input video frame $IMG_5$) included in the merged video frame $IMG_M$ is a first part of a second pixel column Column_2 of the merged video frame $IMG_M$, a rightmost pixel row of another video frame (e.g., resized video frame $IMG_6'$ generated from resizing input video frame $IMG_6$) included in the merged video frame $IMG_M$ is a second part of the second pixel column Column_2 of the merged video frame $IMG_M$, and a rightmost pixel row of yet another video frame (e.g., resized video frame $IMG_7'$ generated from resizing input video frame $IMG_M$) included in the merged video frame $IMG_M$ is a third part of the second pixel column Column_2 of the merged video frame $IMG_M$; and a rightmost pixel row of one video frame (e.g., input video frame $IMG_{N-2}$) included in the merged video frame $IMG_M$ is a first part of a third pixel column Column_3 of the merged video frame $IMG_M$, a rightmost pixel row of another video frame (e.g., resized video frame $IMG_{N-1}'$ generated from resizing input video frame $IMG_{N-1}$) included in the merged video frame $IMG_M$ is a second part of the third pixel column Column_3 of the merged video frame $IMG_M$, and a rightmost pixel row of yet another video frame (e.g., resized video frame $IMG_N'$ generated from resizing input video frame $IMG_N$) included in the merged video frame $IMG_M$ is a third part of the third pixel column Column_3 of the merged video frame $IMG_M$. In this example, concerning video frames having right sides aligned with the same pixel column of the merged video frame $IMG_M$, the width of each resized video frame is equal to the width of one input video frame originally provided by one video source. However, this is for illustrative purposes only, and is not meant to be a limitation of the present invention. In practice, a resizing ratio of an input video frame may be adjusted, depending upon actual design considerations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing system comprising:
a merging circuit, arranged to receive a plurality of input video frames, and merge a plurality of video frames to create a merged video frame, wherein the video frames are derived from the input video frames, respectively; and
a video encoder, arranged to encode the merged video frame to output a bitstream;
wherein the input video frames comprise a first input video frame with a first resolution and a second input video frame with a second resolution, and the first resolution is different from the second resolution; and
wherein the video frames comprise a first video frame derived from the first input video frame and a second video frame derived from the second input video frame, an uppermost pixel row of the first video frame included in the merged video frame is a first part of an uppermost pixel row of the merged video frame, and an uppermost pixel row of the second video frame included in the merged video frame is a second part of the uppermost pixel row of the merged video frame.

2. The video processing system of claim 1, wherein the merging circuit is further arranged to resize at least one of the first input video frame and the second input video frame to generate at least one resized video frame, and the first video frame and the second video frame comprise the at least one resized video frame.

3. A video processing system comprising:
a merging circuit, arranged to receive a plurality of input video frames, and merge a plurality of video frames to create a merged video frame, wherein the video frames are derived from the input video frames, respectively; and
a video encoder, arranged to encode the merged video frame to output a bitstream;
wherein the input video frames comprise a first input video frame with a first resolution and a second input video frame with a second resolution, and the first resolution is different from the second resolution; and
wherein the video frames comprise a first video frame derived from the first input video frame and a second video frame derived from the second input video frame, a lowermost pixel row of the first video frame included in the merged video frame is a first part of a lowermost pixel row of the merged video frame, and a lowermost pixel row of the second video frame included in the merged video frame is a second part of the lowermost pixel row of the merged video frame.

4. The video processing system of claim 3, wherein the merging circuit is further arranged to resize at least one of the first input video frame and the second input video frame to generate at least one resized video frame, and the first video frame and the second video frame comprise the at least one resized video frame.

5. A video processing system comprising:
a merging circuit, arranged to receive a plurality of input video frames, and merge a plurality of video frames to create a merged video frame, wherein the video frames are derived from the input video frames, respectively; and
a video encoder, arranged to encode the merged video frame to output a bitstream;
wherein the input video frames comprise a first input video frame with a first resolution and a second input video frame with a second resolution, and the first resolution is different from the second resolution; and
wherein the video frames comprise a first video frame derived from the first input video frame and a second video frame derived from the second input video frame, a leftmost pixel column of the first video frame included in the merged video frame is a first part of a pixel column of the merged video frame, and a leftmost pixel column of the second video frame included in the merged video frame is a second part of the pixel column of the merged video frame.

6. The video processing system of claim 5, wherein the merging circuit is further arranged to resize at least one of the first input video frame and the second input video frame to generate at least one resized video frame, and the first video frame and the second video frame comprise the at least one resized video frame.

7. A video processing system comprising:
a merging circuit, arranged to receive a plurality of input video frames, and merge a plurality of video frames to create a merged video frame, wherein the video frames are derived from the input video frames, respectively; and
a video encoder, arranged to encode the merged video frame to output a bitstream;
wherein the input video frames comprise a first input video frame with a first resolution and a second input video frame with a second resolution, and the first resolution is different from the second resolution; and wherein the video frames comprise a first video frame derived from the first input video frame and a second video frame derived from the second input video frame, a rightmost pixel column of the first video frame included in the merged video frame is a first part of a pixel column of the merged video frame, and a rightmost pixel column of the second video frame included in the merged video frame is a second part of the pixel column of the merged video frame.

8. The video processing system of claim 7, wherein the merging circuit is further arranged to resize at least one of the first input video frame and the second input video frame to generate at least one resized video frame, and the first video frame and the second video frame comprise the at least one resized video frame.

9. The video processing system of claim 1, wherein the merging circuit receives the input video frames from different video sources, respectively.

10. The video processing system of claim 1, wherein the input video frames have a same timestamp.

11. The video processing system of claim 1, wherein the video encoder comprises:
- a processing circuit, arranged to process pixel data of the merged video frame to generate encoding-related data, wherein the encoding-related data comprise at least quantized transform coefficients; and
- a universal binary entropy (UBE) syntax encoder, arranged to process a plurality of syntax elements to generate UBE syntax data, wherein the encoding-related data are represented by the syntax elements, the processing circuit operates according to a video coding standard, the video coding standard supports arithmetic encoding, and the UBE syntax data contain no arithmetic-encoded syntax data.

* * * * *